United States Patent [19]

Wuchinich

[11] Patent Number: 5,811,909
[45] Date of Patent: Sep. 22, 1998

[54] SUPERTHERMOELASTIC RESONATORS

[76] Inventor: David G. Wuchinich, 116 Pinehurst Ave., New York, N.Y. 10033

[21] Appl. No.: 782,569

[22] Filed: Jan. 10, 1997

Related U.S. Application Data

[60] Provisional application No. 60/009,885 Jan. 11, 1996.

[51] Int. Cl.[6] .................................................. H01L 41/08
[52] U.S. Cl. ............................................. 310/316; 310/323
[58] Field of Search .................................... 310/316, 323, 310/325

[56] References Cited

U.S. PATENT DOCUMENTS

| 2,514,080 | 7/1950 | Mason ....................................... 310/323 |
| 3,174,857 | 3/1965 | Buehler ...................................... 73/170 |
| 3,589,363 | 6/1971 | Banko ....................................... 128/276 |
| 3,733,590 | 5/1973 | Kaufman .............................. 340/173.2 |
| 3,940,636 | 2/1976 | Perahia ..................................... 310/316 |
| 4,223,676 | 9/1980 | Wuchinich et al. ..................... 128/276 |
| 4,329,875 | 5/1982 | Nolting et al. ......................... 73/290 V |
| 4,597,667 | 7/1986 | Curby et al. ............................ 356/350 |
| 4,750,488 | 6/1988 | Wuchinich et al. ................. 128/303 R |
| 4,789,804 | 12/1988 | Karube et al. .......................... 310/328 |
| 5,136,817 | 8/1992 | Tabata et al. ........................ 51/165.71 |
| 5,171,387 | 12/1992 | Wuchinich .............................. 156/73.3 |
| 5,214,339 | 5/1993 | Naito ........................................ 310/316 |
| 5,235,235 | 8/1993 | Martin et al. ........................ 310/313 D |
| 5,275,885 | 1/1994 | Ogura ....................................... 428/383 |
| 5,304,115 | 4/1994 | Pflueger et al. ........................... 604/22 |
| 5,326,342 | 7/1994 | Pflueger .................................... 604/22 |
| 5,341,818 | 8/1994 | Abrams et al. .......................... 128/772 |
| 5,368,035 | 11/1994 | Hamm et al. ....................... 128/662.06 |
| 5,464,016 | 11/1995 | Nicholas et al. .................... 128/662.06 |
| 5,509,417 | 4/1996 | Dias et al. ........................... 128/662.06 |
| 5,546,948 | 8/1996 | Hamm et al. ....................... 128/662.06 |

OTHER PUBLICATIONS

T.W. Duerig et al, Engineering Aspects of Shape Memory Alloys, Butterworth–Heineman, 1990, p. 29.

Timet, Properties and Processing of Ti–6A1–4V, 1983, p. 14.

*Primary Examiner*—Thomas M. Dougherty

[57] ABSTRACT

Apparatus using the temperature sensitive elastic property of super elastic alloys is disclosed for measuring temperate using, and controlling the vibration in response to temperature of, resonant electro-mechanical systems in commercial, industrial and medical applications.

15 Claims, 7 Drawing Sheets

SUPERTHERMOELASTIC RESONATORS

BACKGROUND—CROSS REFERENCES TO RELATED APPLICATIONS

This application is based on United States provisional application No. 60/009,885 filed Jan. 11, 1996.

BACKGROUND—FIELD OF INVENTION

This invention describes the use of superelastic alloys as mechanical resonant vibrators for controlling the application of vibratory energy in commercial, industrial and medical applications.

BACKGROUND—DESCRIPTION OF PRIOR ART

The industrial and medical applications for intense ultrasonic vibration utilizing direct contact between a vibrating structure and the target media can be traced to Mason's patented invention of the solid horn or velocity transformer. Subsequent applications of the theory provided the basis for the practical design of a family of mechanical velocity transforming resonators that substantially increased the magnitude of vibration that structures could provide and withstand. The theory and its practical applications are not limited to the ultrasonic frequency regime, but apply equally well to sonic and infrasonic frequencies and devices and equipment utilizing this invention and theory have been designed to operate within the entire frequency range of mechanical vibration.

This technology was applied to practical ends through the use of electro-mechanical magnetostrictive and piezoelectric transducers which convert electrical oscillations of current and voltage into mechanical vibration of the same frequency. This vibration, while usually incapable of producing effects useful in industrial processes or medical procedures, is entirely capable of exciting vibration in the structures elucidated as just described. These transducers then provided a practical means of supplying significant levels of vibration to subject material through the use of horns.

The results of such endeavors are chronicled in many patents. In particular, Wuchinich provides a review of industrial patents and publications that describe apparatus and methods for exploiting ultrasonic vibration. Banko and Wuchinich, among others, invented very high intensity ultrasonic resonant systems for dissecting and simultaneously aspirating biological tissues such as the human lens and brain neoplasms that have found wide acceptance in surgical practice. The process is macroscopically athermal with consequential favorable effects upon healing and upon neighboring sensitive tissue structures.

Most of the devices described above execute extensional vibration in which slender structures rhythmically stretch and contract along their length, but applications have also been made for transverse or bending motion. Torsional or twisting action resonant vibrators have also been described and are well known in the art. Designs have been developed that also combine bending with extensional movement. Recently, the use of ultrasonically activated knives designed for minimally invasive surgical procedures that utilize a combination of extensional and bending motion have been evaluated.

Surgical excision of the human lens, brain and spinal cord tumors and other tissue has greatly benefited from the application of ultrasonic vibration used in conjunction with aspiration. The procedures, however, require that the surgical tips and their immediate environment be kept at temperatures reasonably close to the natural body temperature if inadvertent destruction of unrelated matter is to be avoided. In the case of eye surgery, careful control of the irrigating fluid flowing into the eye over the tip and out of the eye, along with excised tissue, through the center of the tip is necessary if the temperature of the ocular compartment is not to increase from the work done just to move the tip in fluid within the closed ocular space at ultrasonical frequencies. Of concern as well in ophthalmic procedures, where the ultrasonic tip is placed in the portion of the eye between the lens and the cornea, is damage to the cornea caused by inadvertent contact with the end of the vibrating tip.

In the removal of tumors, particularly those tissues accessible through a narrow opening, it is imperative that the sides of the tip, which are also vibrating intensely, do not come into lateral contact with tissue forming the opening walls. Should such contact take place, burning of the site margins can occur. For this reason, the tip is normally shrouded by a rigid sleeve which limits to some extent access to remote surgical sites and dictates the size of the surgical incision itself. However, even with this protection, should the irrigation fluid flow, which is conveyed in the normally annular space between the sleeve and the tip, be interrupted, and lateral pressure placed upon the tip so as to force it against the side of the sleeve, destruction of sleeve may result which can also cause tissue damage. In addition, should irrigation flow diminish or cease while the tip is vibrating, dissection margins just adjacent to the target site, that can not be protected by the sleeve, can be singed.

Periodontic and endodontic procedures also exploit ultrasonic vibration for the cleaning and removal of subgingival tissue and the preparation of root canals. In these applications a slender stylus is guided under the gums or into the root canal where its vibration assists cleaning procedures. Temperature rise within such confined operative sites requires control to avoid damage to tissue. The control of irrigation flow removes heat produced as the vibrating tip contacts the tooth or soft tissue, but, at present, there is no method for directly sensing the temperature of the tip. Hence, moderation of excessive temperature rise remains uncertain.

That danger of an interruption in fluid circulation or irrigation flow has been recognized is evident in the inclusion of systems to monitor flow and alert the surgeon of an abnormal condition in practical ultrasonic surgical systems. However, all such safeguards rely not upon sensing the tip temperature, which is the source of potential danger, but the condition of the coolant flow. Inasmuch as the coolant is a fluid and subject to inertia in flow, the response from flow sensors necessarily lags somewhat behind an interruption—with the result that the tip or surgical site may become overheated before the surgeon is alerted or the procedure is otherwise interrupted. In addition, it is conceivable that the flow can be interrupted without tripping a sensor located on the administering equipment as, for example, may happen if the irrigation tube becomes disconnected just before entering the sleeve surrounding the tip or at another point between the equipment and the handpiece.

Apart from the control of temperature at the surgical site when ultrasonic aspiration is applied, the ability to directly sense tip temperature also provides a means to detect defective ultrasonic vibration of the tip, produced, for example, by a defect in the crystalline structure in the material from which the tip is made, or improper assembly of the tip to the rest of the surgical handpiece. Such conditions inevitably generate heat which raises the tip temperature, possibly resulting in destruction of the tip as well as scorched flesh.

OBJECTS AND ADVANTAGES

Accordingly, the object and advantage of this invention is the ability to control the production of excessive temperature in a mechanical resonant vibrator and thereby prevent, through automatic or manual intervention, unwanted damage to the vibrator or the subject material or matter of its application. Another object of this invention is provide a measurement of the temperature of a portion of the mechanical resonant vibrator, thereby permitting its observation and the safe control of its performance.

Indeed, as noted, devices following prior art required a rigid sleeve to protect adjacent, untargeted tissue from burns inadvertently incurred by incidental contact with the lateral surface of the surgical tip. However, tips fabricated from superthermoelastic material may, in fact, be provided with slender conformal elastomeric sleeves, permitting the use of smaller incisions and greater penetration, such as exist in the developing field of minimally invasive surgery. With the use of such material, unintended contact with tissue that raises the tip temperature as little as thirty degrees Fahrenheit can be automatically detected and prevented.

Such a tip may be made, for example, from the alloy Nitinol available commercially, heated to 650 degrees C. and then quenched in water, a treatment that freezes the crystalline structure in the austenitic state which is capable of transmitting ultrasonic vibration in the same manner as other metals such as stainless steel, monel and Titanium. Both the density of the material and Young's modulus can then be measured for the material and these values used to compute the correct length and velocity transformation ratio for a given geometry.

Since all identified modes of resonant vibration, whether extensional, bending, torsional or bending-extensional require elasticity all may be subject to the temperature sensitive detection method described here providing at least one component of the vibratory apparatus is superthermoelastic. Furthermore, superthermoelastic material may be employed to construct, in addition to stepped half wave extensional transformers, all or part of any mechanical elastic resonator well known in the art.

DRAWING FIGURES

REFERENCE NUMERALS IN DRAWINGS

Figure 1:
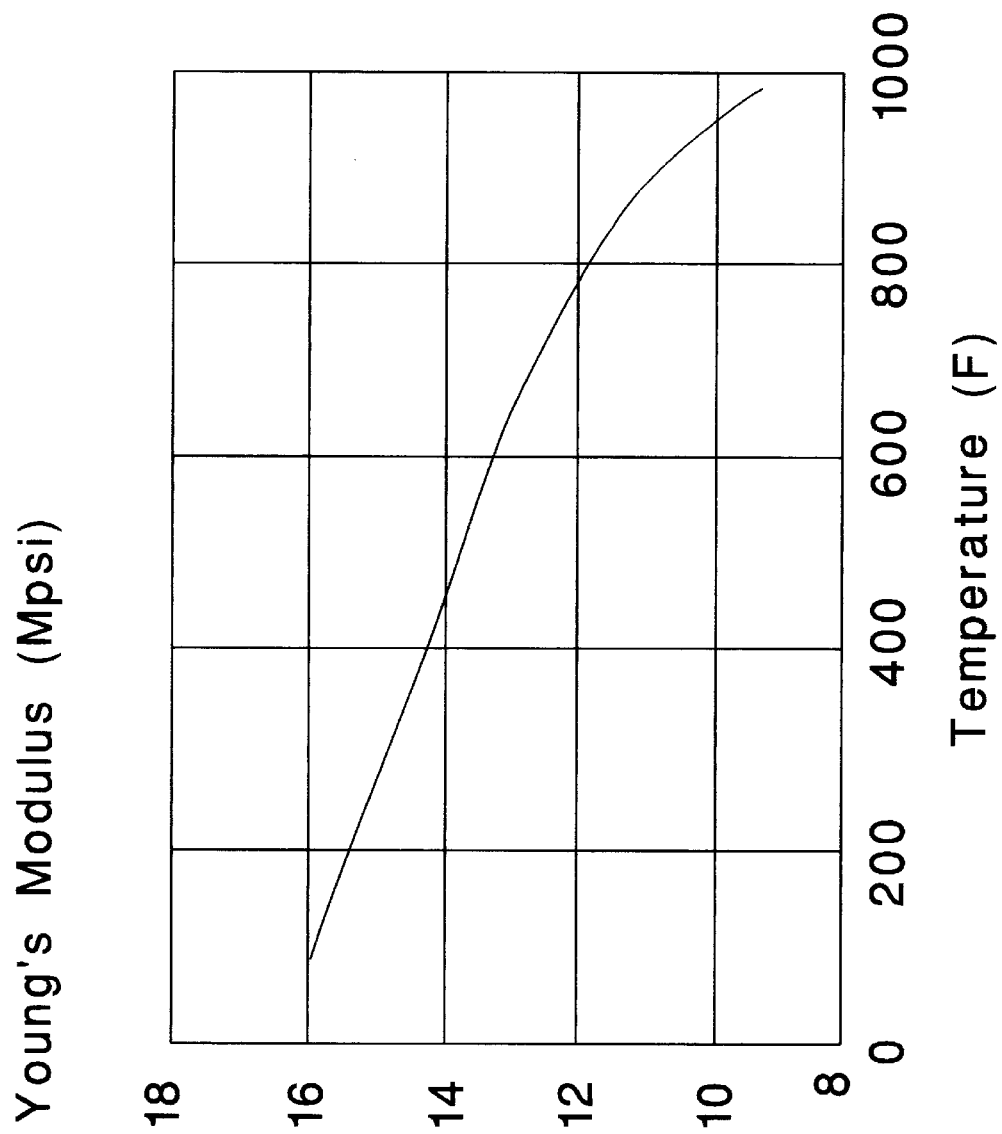
FIG. 1 shows the relation of elasticity and temperature in a conventional metal alloy.

1 Mass M
2 Spring $k_M$
3 Spring $k_m$
4 Mass m
5 First section of half wavelength stepped velocity transformer
6 Second section of half wavelength stepped velocity transformer
7 Enabling control connection
8 Enabling control input to on-off control
9 Disabling control input to on-off control
10 On-off control
11 On-off control output
12 Electrical generator on-off control input
13 Electrical generator
14 Electrical generator output
15 Electro-mechanical transducer electrical input
16 Electro-mechanical transducer
17 Velocity transformers, tool or tip.
18 Mechanical contact face between tool or instrument tip and subject material
19 Subject material
20 Frequency detector input
21 Frequency detector
22 Frequency detector output
23 Frequency counter
24 Frequency counter input
25 First comparator input
26 Second comparator input
27 Comparator
28 Comparator output
30 Error amplifier subtracting input
31 Error amplifier adding input
32 Error amplifier
33 Error amplifier output
34 Electrical generator amplitude control input

DESCRIPTION—FIGS. 1 TO 7

The development of superelastic or shape memory alloys patented by Buehler and Wiley provided material that could be subjected to strains far in excess of those that would cause permanent deformation in other alloys and would nevertheless recover their original shape once the forces causing the strain were released. These materials also can be heat treated while in one particular shape, then distorted at lower temperatures only to recover their original shape when reheated. The metallurgical basis for the formulation of these alloys is now well known and understood and practical applications utilizing either the superelastic or shape memory effects, or both have been developed in medicine and industry. At least one surgical ultrasonic use for the material in its superelastic or shape memory state where exception static strains can be imposed has been described by Pflueger.

Figure 2:
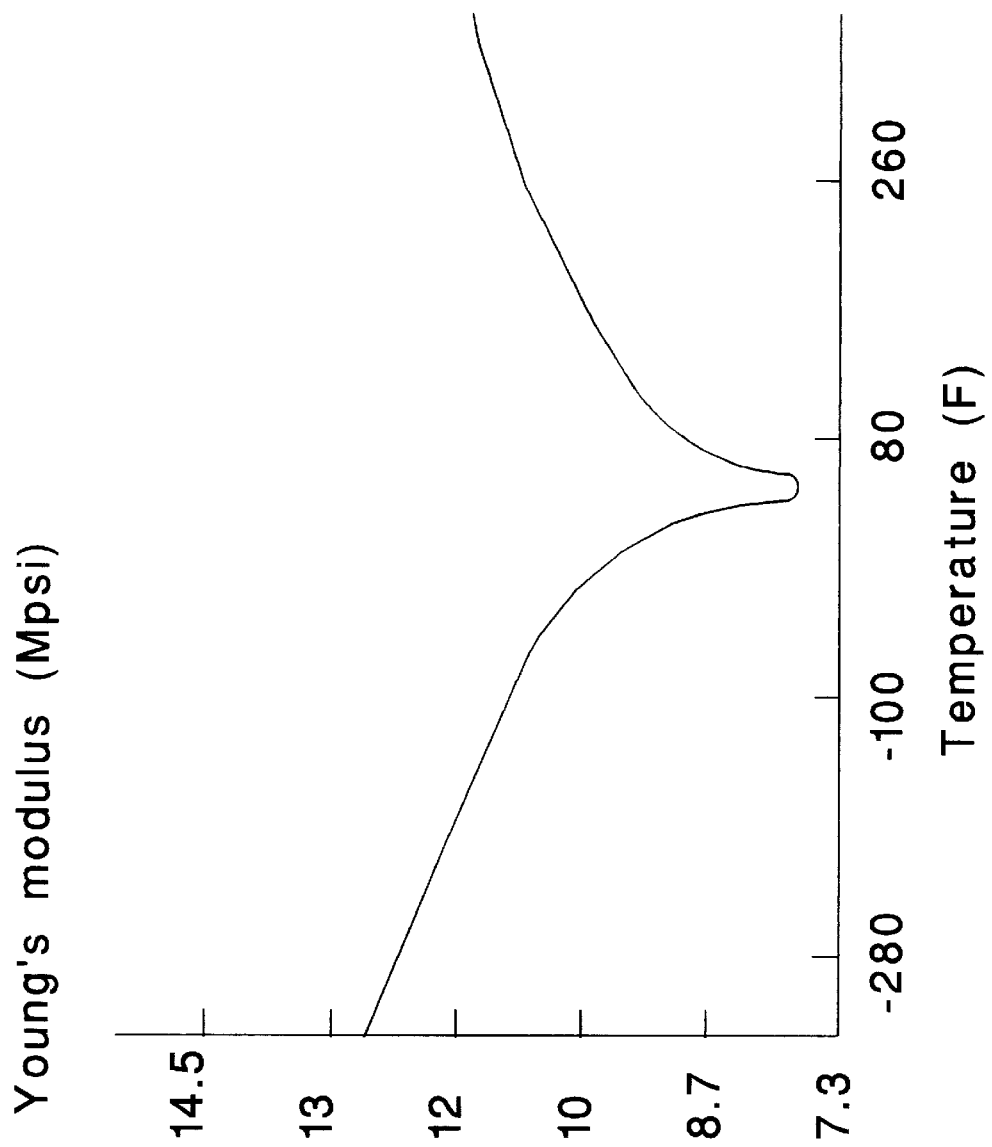
FIG. 2 shows the relation of elasticity and temperature in a superelastic alloy.

Important to this invention is the reported and observed dramatic variation of elasticity with temperature in at least some of these alloys. FIG. 1 illustrates the variation in Young's Modulus with temperature in the alloy of titanium containing 6 percent Aluminum and 4 percent Vanadium, a material commonly used in ultrasonic velocity transformers, horns and tips. It is clear that the elasticity decreases with increasing temperature. Actual approximations taken from this curve provide a value of about −340 parts per million per degree Fahrenheit (ppm/F). In contrast, FIG. 2 illustrates the variation with temperature of the same modulus for a particular superelastic alloy composed of Nickel and Titanium. In the region of normal room temperatures the elasticity is seen to rapidly increase with temperature and at a rate that is much greater than exhibited by the alloy of Titanium, Aluminum and Vanadium. In fact measurements made in the vicinity of room temperature shown that Young's modulus for a Titanium Nickel superelastic alloy increases at a rate of 1000 ppm per degree F. Thus this elastic property not only varies with temperature in the opposite direction to a Titanium alloy, but varies with a magnitude three times larger.

Figure 3:
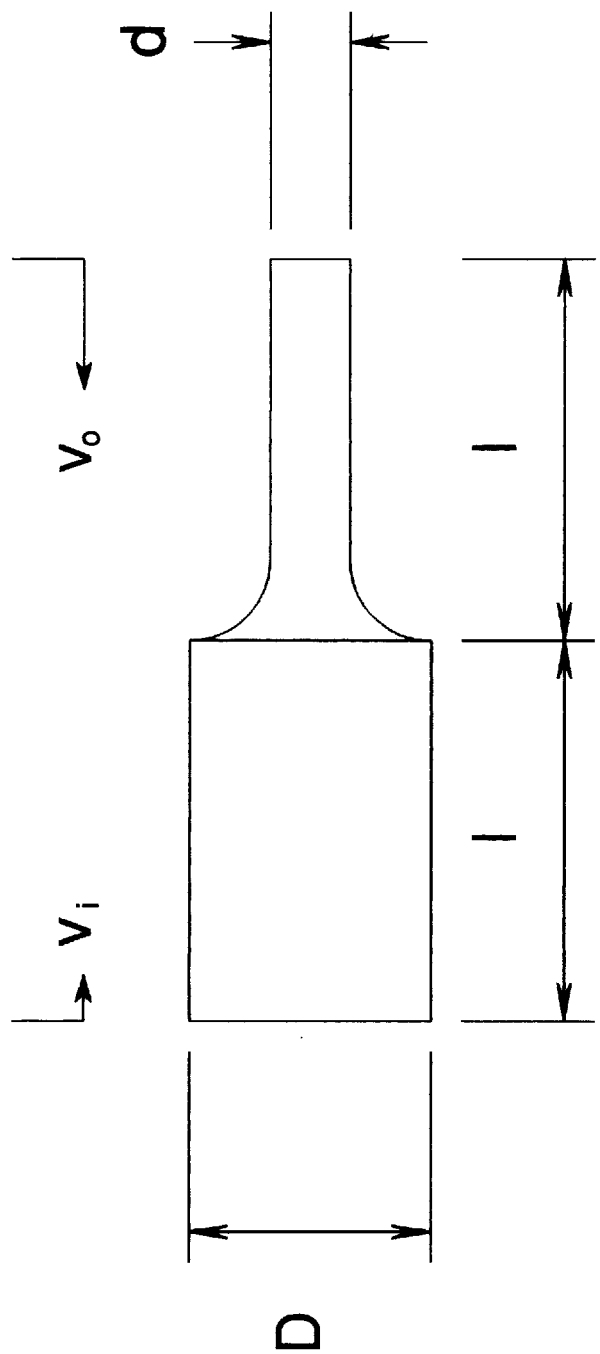
FIG. 3 illustrates the geometrical, vibration quantities and their direction in a typical mechanical resonant vibrator.

The effect of elasticity variation upon the resonant frequency of a velocity transformer can be examined by first identifying the performance of a common and widely used design such as the cylindrical half wave stepped horn shown in FIG. 3. The relative vibrational velocities at the input (i), where the transducer is normally attached, and output (o) faces are shown qualitatively and by formula given below:

$$f = \frac{\sqrt{Y/\rho}}{4l} \quad (1)$$

$$V_o/V_i = (D/d)^2 \quad (2)$$

Figure 4:
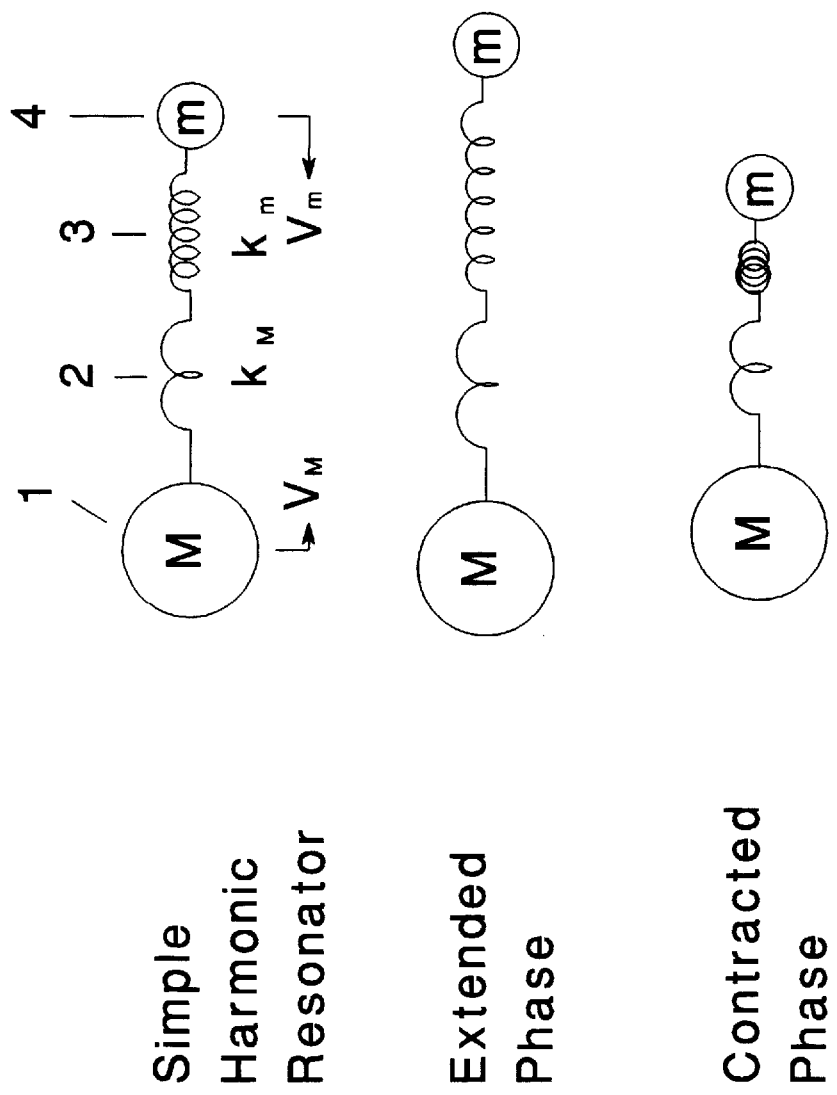
FIG. 4 illustrates the mechanical elements, vibration quantities and their direction in a discrete analog of a typical mechanical resonant vibrator.

The frequency of vibration is expressed as a function of Young's modulus, Y, the density, $\rho$ and length l. From the expression for the frequency it is clear that an increase in the modulus will result in an increase in the resonant frequency. The effect can be seen in the discrete analog for the stepped horn shown in FIG. 4. In this representation each section of the horn of length l is composed of a spring and a mass. The ratio of the movement of the two masses 1 and 4 is proportional to their mass ratio and, again, the frequency is dependent upon the equivalent spring constant, k which is determined by the individual springs 2 and 3. The relationships between the frequency of resonant vibration and the masses and spring constants are given as shown below:

$$f = \frac{\left[k\left(\frac{1}{m} + \frac{1}{M}\right)\right]^{1/2}}{2\pi} \quad (3)$$

$$\frac{1}{k} = \frac{1}{k_m} + \frac{1}{k_M} \quad (4)$$

$$V_m/V_M = M/m \quad (5)$$

This discrete simplification reveals how velocity amplification is obtained in the structure shown in FIG. 3 and it also shows that, should the right portion of the horn in FIG. 3 be composed of a different material than that of the left, the resonant frequency remains a function of the individual elasticities. For example, if the portion of the horn having mass m is made of superthermoelastic material (a term defining material whose elasticity changes with temperature in much greater proportion than materials used in conventional transducers, horns and velocity transformers) the frequency of the entire assembly is disproportionately determined by the elasticity of this part.

Figure 5:
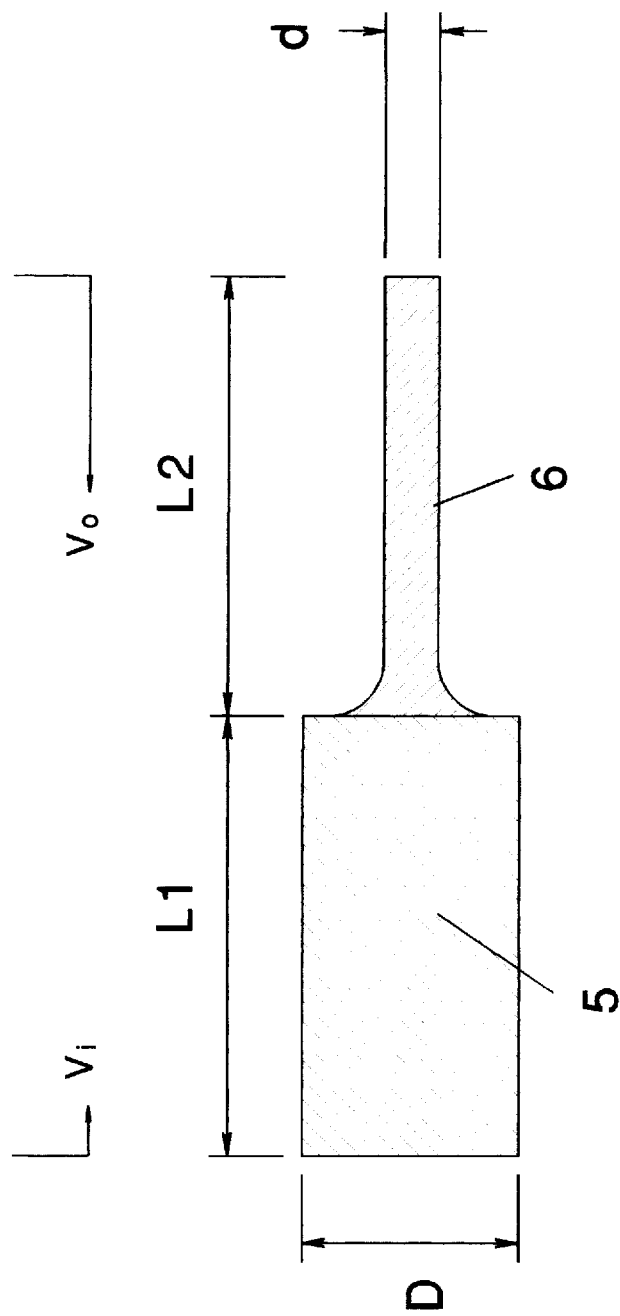
FIG. 5 illustrates the geometrical, vibration quantities and their direction in a mechanical resonator composed of both conventional material and a superelastic alloy.

FIG. 5 describes a stepped horn in which the output section 6, as identified in FIG. 3, is composed of a superthermoelastic material and the input section 5 is made from conventional material. Section 6 may be an ultrasonic surgical tip for example. For this composite resonator the relevant quantities are related by:

$$V_o/V_i = (D/d)^2 \sqrt{\frac{Y_1 \rho_1}{Y_2 \rho_2}} = \frac{D^2 l_1 \rho_1}{d^2 l_2 \rho_2} = M/m \quad (6)$$

where $$l_1 = \frac{\sqrt{\frac{Y_1}{\rho_1}}}{4f} \quad (7)$$

$$l_2 = \frac{\sqrt{\frac{Y_2}{\rho_2}}}{4f} \quad (8)$$

Figure 6:
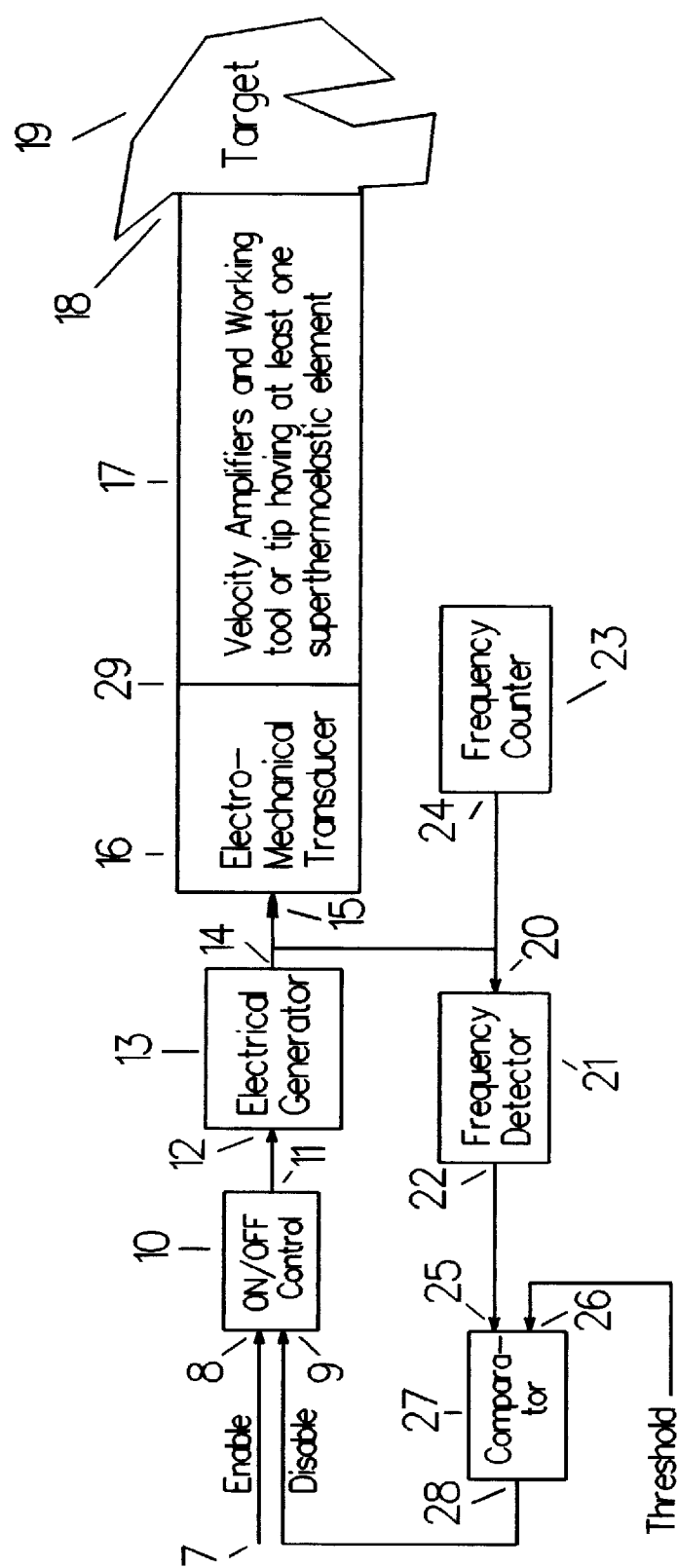
FIG. 6 is a block diagram of the invention, illustrating all components sufficient and necessary for its operation.

FIG. 6 is a block diagram of a system generating resonant mechanical vibration utilizing supertheromelastic material for discrete or on-off control of vibration.

Figure 7:
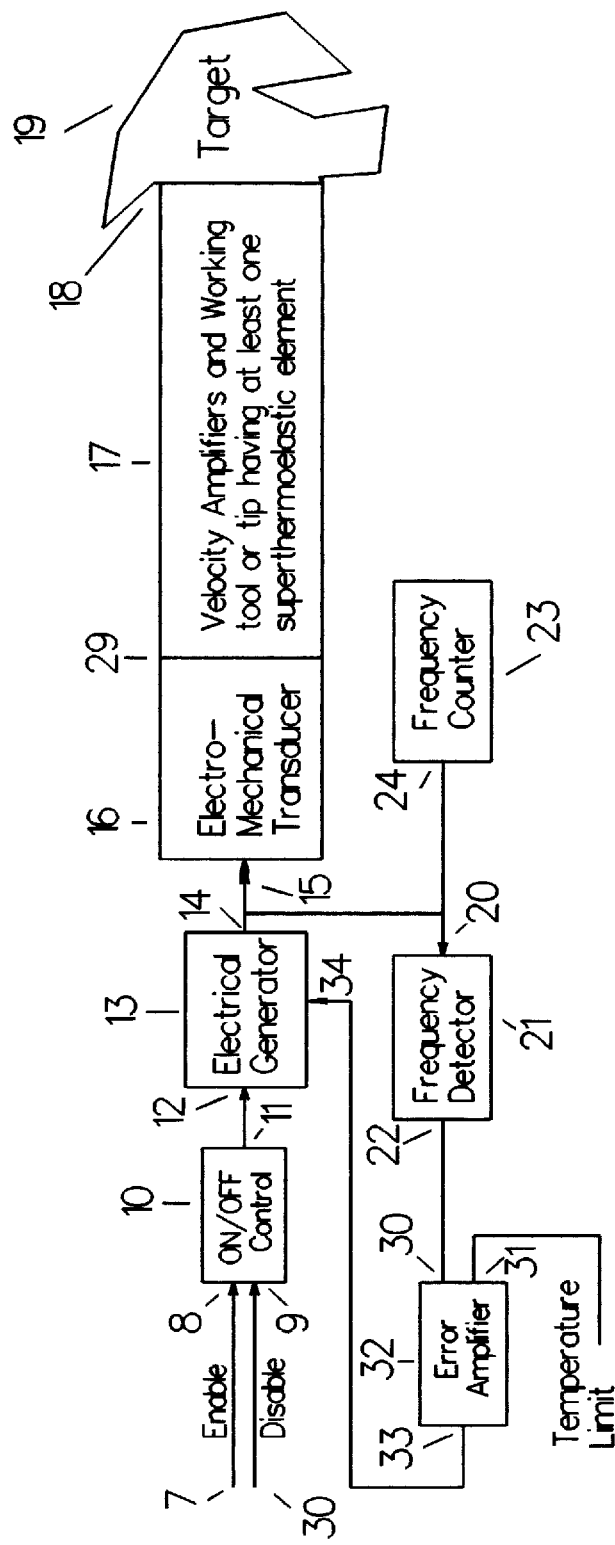
FIG. 7 is a block diagram of the invention, illustrating all components necessary for its operation with modulated control.

FIG. 7 is a block diagram of a system generating resonant mechanical vibration utilizing superthermoelastic material for continuous or analog control of vibration.

OPERATION—FIGS. 6 AND 7

An generator 13 supplies alternating electrical current and voltage of the correct resonant frequency to excite and maintain vibration in an electro mechanical transducer 16 through electrical connection of its output 14 to the transducer's electrical input 15.

The transducer is mechanically connected by screw threads, press fit, welding, brazing, adhesives or other means to a velocity transformer or other body 17, at least one of whose elements is made of superthermoelastic material. The output face of this body may be in mechanical contact 18 with the target or subject material 19. If present this contact may be enforced by applied force or pressure.

An elevation in the temperature of body 17, resulting from contact with the target 19 or other matter or from a change in the temperature of the operating environment or mechanical defect, will elevate the resonant frequency of the vibration due to the presence of superthermoelastic material in body 19.

The generator frequency of the electrical current and voltage will change and increase to maintain the resonant vibration. This frequency is measured by a frequency counter 23 connected to the electrical output of the generator 14. Frequency counter 23 provides a visual indication of temperature change and thereby provides an observer with information concerning safe and proper system operation. Generator output 14 is also connected to a frequency detector 21 which provides at its output 22 a voltage or current proportional to the frequency. This output 22 is compared with a threshold voltage or current level at inputs 23 and 26, respectively of comparator 27.

If the frequency detector output 22 exceeds the threshold level at input 26 the comparator generates at its output 28 a voltage or current. This signal is connected to the disabling input 9 or on-off control 10. When such a signal is present at input 9, regardless of the presence of an enabling signal at input 8, the on-off control 10 produces a signal at output 11. This signal is connected to the electrical generator on-off input 12 and turns off the generator.

FIG. 7 illustrates a modulating method for control that reduces rather than terminates vibration. The output 22 of the frequency detector 21 is subtracted from a temperature limiting signal by connection to the inputs 30 and 31 respectively of error amplifier 32. The error amplifier greatly magnifies the difference between these signals at its output 33 which is, in turn, connected to an amplitude controlling input 34 of the generator 13. A signal present at input 34 acts to reduce the magnitude of the voltage and current exciting and maintaining vibration in the electromechanical transducer 16. A reduction in current or voltage reduces the vibration magnitude as well. This reduction continues until the frequency detector output 22 approximately equals the temperature limiting signal.

SUMMARY AND SCOPE

The invention shown enables temperature responsive control of vibration to enhance the operation of medical instruments and commercial and industrial operation utilizing vibration producing equipment.

While it is apparent that the invention herein disclosed is well calculated to fulfill the objects above stated, it will be appreciated that numerous modifications and embodiments may be devised by those skilled in the art. For example, since all identified modes of resonant vibration, whether extensional, bending, torsional or bending-extensional require elasticity all may be subject to the temperature sensitive detection apparatus described here providing at least one component of the vibratory apparatus is superthermoelastic. Furthermore, superthermoelastic material may be employed to construct, in addition to stepped half wave extensional transformers, all or part of any mechanical elastic resonator well known in the art.

Apparent to a practitioner skilled in art, the systems illustrated in FIGS. 6 and 7 may also serve as thermometers and as thermostats. The frequency counter 23 indicates temperature changes. The comparator output 28 or error amplifier output 33, rather than controlling the generator operation, can instead be connected to the control inputs of other equipment which can then be made to respond to the temperature change sensed by the vibrating system.

It is further apparent that vibration frequency range over which this invention may be employed is not limited, extending from the infrasonic to ultrasonic regimes.

I claim:

1. Apparatus comprising:

an electrical generator, having an electrically controlled on-off switch with an input, supplying electrical voltage and current by connection to an electromechanical transducer mechanically that is joined to a body having both mass and elasticity of which at least one portion is superthermoelastic, the said transducer and said body exhibiting a least one mechanical vibrational resonance in response to the current and voltage supplied by said generator;

a frequency responsive detector connected to said generator output a comparator means, whose inputs are connected to said frequency detector and to a control signal, and having its output connected to the input of said on-off generator switch.

2. The apparatus of claim 1 wherein said superthermoelastic material is a Nickel-Titanium alloy.

3. The apparatus of claim 1 wherein said body includes a velocity transformer.

4. The apparatus of claim 1 wherein said body includes a surgical tip.

5. The apparatus of claim 1 wherein said body includes an ultrasonic horn.

6. Apparatus comprising:

an electrical generator, having an electrically controllable output power control with an input, supplying electrical voltage and current by connection to an electromechanical transducer mechanically that is joined to a body having both mass and elasticity of which at least one portion is superthermoelastic, said transducer and said body exhibiting a least one mechanical vibrational resonance in response to the current and voltage supplied by said generator;

a frequency responsive detector connected to said generator output an error amplifying means having at least two input and one output, whose said inputs are connected to said frequency detector and to a control signal, and having said output connected to said generator power control input.

7. The apparatus of claim 6 wherein said superthermoelastic material is a Nickel-Titanium alloy.

8. The apparatus of claim 6 wherein saud body includes a velocity transformer.

9. The apparatus of claim 6 wherein said body includes a surgical tip.

10. The apparatus of claim 6 wherein said body includes an ultrasonic horn.

11. Apparatus comprising:

an electrical generator, supplying electrical voltage and current by connection to an electromechanical transducer mechanically that is joined to a body having both mass and elasticity of which a portion is a working tip made of austentic superthermoelastic material in contact with a target media, said transducer and said body exhibiting a least one mechanical vibrational resonance in response to the current and voltage supplied by said generator;

and a frequency detecting means connected to the generator output.

12. The apparatus of claim 11 wherein said austentic superthermoelastic material is a Nickel-Titanium alloy.

13. The apparatus of claim 11 wherein said body includes a velocity transformer.

14. The apparatus of claim 11 wherein said working tip is a surgical tip.

15. The apparatus of claim 11 wherein said body includes an ultrasonic horn.

* * * * *